US012791219B2

(12) United States Patent
Yu et al.

(10) Patent No.: US 12,791,219 B2
(45) Date of Patent: Nov. 10, 2026

(54) HUMIDIFIER HAVING AN ADJUSTABLE SPRAY ANGLE

(71) Applicant: Shenzhen Hesung Innovation Technology Co., LTD, Shenzhen (CN)

(72) Inventors: Xinfeng Yu, Shenzhen (CN); Xianglu Dai, Shenzhen (CN); Jia Liu, Shenzhen (CN); Aimin He, Shenzhen (CN)

( * ) Notice: Subject to any disclaimer, the term of this patent is extended or adjusted under 35 U.S.C. 154(b) by 283 days.

(21) Appl. No.: 18/624,006

(22) Filed: Apr. 1, 2024

(65) Prior Publication Data

US 2024/0328664 A1 Oct. 3, 2024

(30) Foreign Application Priority Data

Apr. 3, 2023 (CN) ......................... 202320708171.4

(51) Int. Cl.

| | |
|---|---|
| ***F24F 13/14*** | (2006.01) |
| ***B05B 1/02*** | (2006.01) |
| ***B05B 1/04*** | (2006.01) |
| ***B05B 1/14*** | (2006.01) |
| ***B05B 1/16*** | (2006.01) |
| ***B05B 3/00*** | (2006.01) |
| ***B05B 3/02*** | (2006.01) |
| ***F24F 6/00*** | (2006.01) |
| ***F24F 6/14*** | (2006.01) |

(52) U.S. Cl.

CPC ................ *F24F 13/14* (2013.01); *B05B 1/02* (2013.01); *B05B 1/044* (2013.01); *B05B 1/14* (2013.01); *B05B 1/16* (2013.01); *B05B 3/002* (2013.01); *B05B 3/02* (2013.01); *F24F 6/14* (2013.01); *B05B 1/1636* (2013.01); *B05B 1/1645* (2013.01); *F24F 2006/008* (2013.01)

(58) Field of Classification Search

CPC . F24F 13/14; F24F 6/14; F24F 1/0087; B05B 1/02; B05B 1/044; B05B 1/14

See application file for complete search history.

(56) References Cited

U.S. PATENT DOCUMENTS

| | | | | |
|---|---|---|---|---|
| 12,366,372 B2 * | 7/2025 | Bailey | F24F 6/043 | |
| 2011/0068491 A1 * | 3/2011 | Wang | F24F 6/04 | 261/103 |
| 2014/0027234 A1 * | 1/2014 | Zhou | C07D 239/48 | 192/43.1 |

(Continued)

FOREIGN PATENT DOCUMENTS

CN 214841365 U 11/2021

*Primary Examiner* — Nelson J Nieves

(74) *Attorney, Agent, or Firm* — Sandy Lipkin

(57) ABSTRACT

A humidifier includes a humidifier body and a spray assembly. The humidifier body has a mist outlet. The spray assembly has a spray outlet and is rotatably disposed on the humidifier body to enable adjustment of the angle of the spray outlet so that the spray area can be enlarged. Consequently, a user can adjust the spray angle according to the position of an object to be sprayed so that the function of adjusting the spray angle of the humidifier can be fulfilled. One of the spray assembly and the humidifier body has at least two altering grooves, and the other one of the spray assembly and the humidifier body is provided with an altering adjustment member. The altering adjustment member can move from one altering groove to another altering groove along the rotation direction of the spray assembly to alter the spray angle.

14 Claims, 3 Drawing Sheets

(56) References Cited

U.S. PATENT DOCUMENTS

| | | | | |
|---|---|---|---|---|
| 2020/0278123 | A1* | 9/2020 | Kumra | F24F 6/16 |
| 2020/0370769 | A1* | 11/2020 | Yang | F24F 6/12 |
| 2020/0393149 | A1* | 12/2020 | Yang | F24F 6/14 |
| 2021/0003303 | A1* | 1/2021 | Ouyang | F24F 11/0008 |
| 2023/0280054 | A1* | 9/2023 | Chao | F24F 6/12<br>261/78.1 |

* cited by examiner

HUMIDIFIER HAVING AN ADJUSTABLE SPRAY ANGLE

CROSS-REFERENCE TO RELATED APPLICATION(S)

This application claims priority to Chinese Patent Application No. 202320708171.4 filed Apr. 3, 2023, the disclosure of which is incorporated herein by reference in its entirety.

TECHNICAL FIELD

The present disclosure belongs to the field of humidification devices and, in particular, relates to a humidifier having an adjustable spray angle.

BACKGROUND

Nowadays, more and more people use humidifiers to enhance indoor air humidity and temperature to improve environmental comfort. To satisfy the user requirements, Chinese Utility Model patent application No. 202120592664.7 discloses a mist outlet nozzle structure for a humidifier. The mist outlet nozzle in the humidifier can adjust the mist outlet angle in an up-down direction, effectively enlarging the mist outlet area, and the user experience can be improved. However, in practice, to spray water mist to a further region, the speed of airflow mixed with water mist needs to be increased. If the preceding humidifier is used in this case, when the airflow with a relatively high speed impacts on an arc-shaped cover, the arc-shaped cover may slide within a mist outlet cavity. As a result, the stability of the mist outlet angle of the mist outlet nozzle is reduced, and the user requirements cannot be satisfied.

Based on the preceding, there is an urgent need for a humidifier having an adjustable spray angle to solve the technical problems existing in the related art.

SUMMARY

The present disclosure provides a humidifier having an adjustable spray angle so that not only the spray angle can be adjusted to enlarge the spray area, but also the stability of the spray angle can be ensured, thereby improving the user experience.

The present disclosure adopts the technical solutions below.

The humidifier having an adjustable spray angle includes a humidifier body and a spray assembly.

A surface of the humidifier body has a mist outlet.

The spray assembly has a spray outlet which communicates with the mist outlet and is rotatably disposed on the humidifier body to enable adjustment of a spray angle of the spray outlet.

One of the spray assembly and the humidifier body has at least two altering grooves arranged in parallel, another one of the spray assembly and the humidifier body is provided with an altering adjustment member, and the altering adjustment member is configured to move from one altering groove to another altering groove along a rotation direction of the spray assembly to alter the spray angle.

REFERENCE LIST

Figure 1:
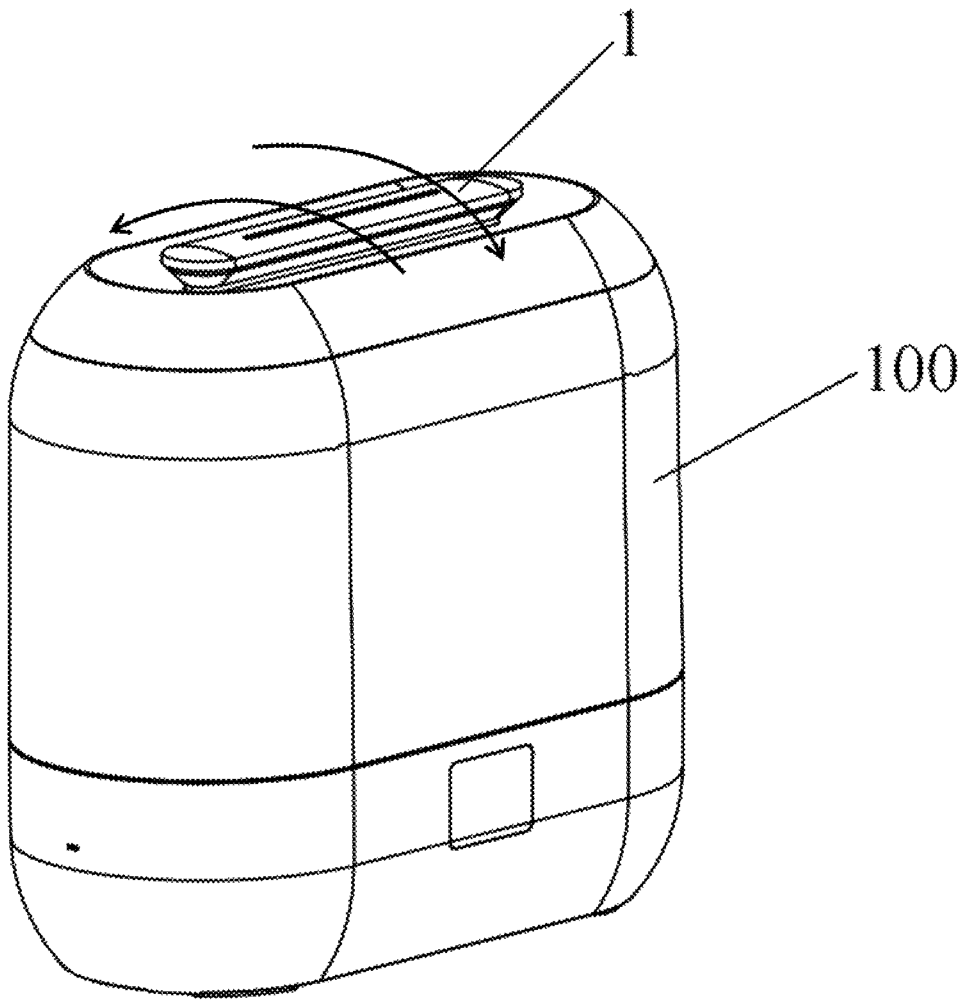
FIG. 1 is an overall assembly view illustrating a humidifier having an adjustable spray angle according to this embodiment.

100 humidifier body
110 mist outlet
120 arc-shaped groove
1 spray assembly
10 spray outlet
11 lower housing
111 arc-shaped protrusion
112 accommodating groove
113 limiting mounting portion
114 mounting hole
12 upper housing
2 altering groove
3 altering adjustment member
31 elastic member
32 adjustment block
321 cooperation portion
3211 mounting groove
322 inserting portion
3221 arc-shaped lock bolt
4 buckling shaft
5 engagement portion
51 buckling groove

DETAILED DESCRIPTION

In the description of the present disclosure, it is to be noted that orientations or position relations indicated by terms such as "center", "upper", "lower", "left", "right", "vertical", "horizontal", "in", "out" are orientations or position relations based on the drawings. These orientations or position relations are intended only to facilitate the description of the present disclosure and simplify the description and not to indicate or imply that a device or element referred to must have such specific orientations or must be configured or operated in such specific orientations. In addition, terms such as "first" and "second" are used merely for the purpose of description and are not to be construed as indicating or implying relative importance. Terms "first position" and "second position" are two different positions.

In the description of the present disclosure, it is to be noted that unless otherwise expressly specified and limited, the term "mounted", "connected to each other", or "connected" is to be construed in a broad sense, for example, as securely connected or detachably connected; mechanically connected or electrically connected; directly connected to each other or indirectly connected to each other via an intermediary; or internally connected between two elements. For those of ordinary skill in the art, specific meanings of the preceding terms in the present disclosure may be understood based on specific situations.

Technical solutions of the present disclosure are clearly and completely described below in conjunction with the drawings. Apparently, embodiments described herein are part, not all, of the embodiments of the present disclosure. Based on the embodiments of the present utility mode, all other embodiments obtained by those of ordinary skill in the art are within the scope of the present utility mode on the premise that no creative work is done.

A humidifier having an adjustable spray angle provided in the present disclosure is described below in conjunction with FIGS. 1 to 4 and specific embodiments.

Figure 2:
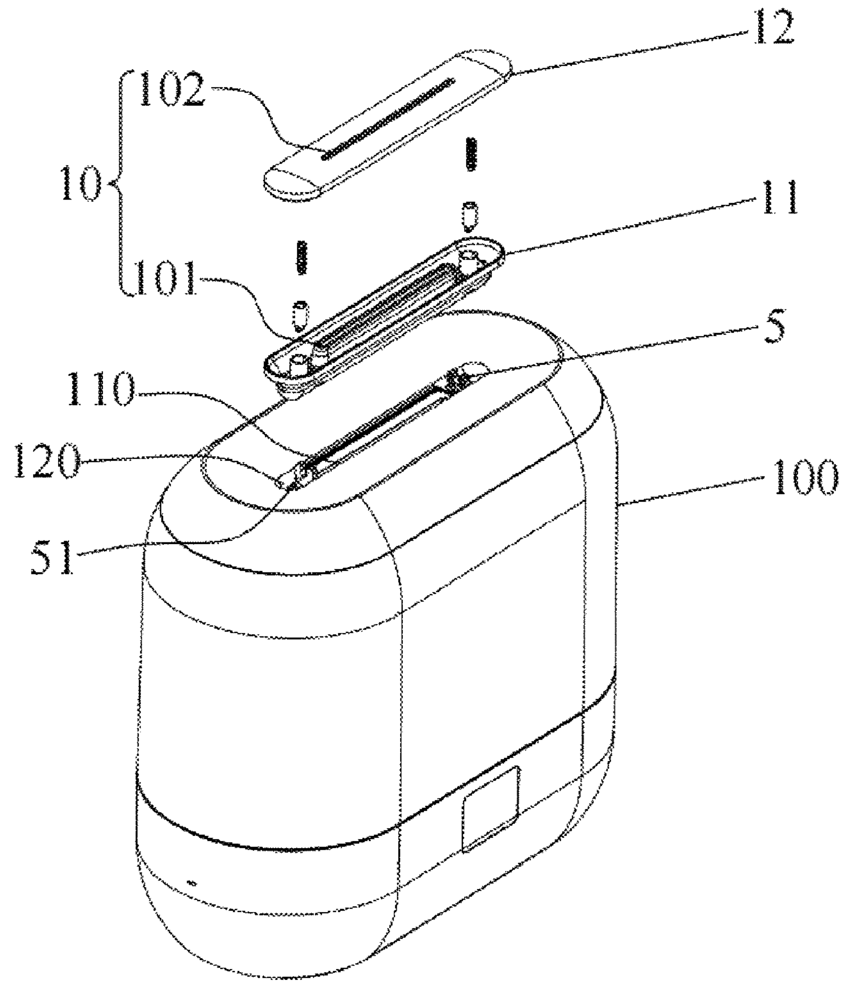
FIG. 2 is an exploded view illustrating a partial structure of a humidifier having an adjustable spray angle according to this embodiment.

Referring to FIGS. 1 and 2, the humidifier having an adjustable spray angle provided in this embodiment includes a humidifier body 100 and a spray assembly 1. The surface of the humidifier body 100 has a mist outlet 110. In this embodiment, the humidifier uses an ultrasonic humidifier. Through the high-frequency vibration of an atomizing sheet inside the humidifier body 100, water inside a water tank inside the humidifier body 100 can be shocked away from the water surface to generate dissipated water and mist, and the water and mist can be discharged from the mist outlet 110 along with airflow. The spray assembly 1 has a spray outlet 10 which communicates with the preceding mist outlet 110 and is rotatably disposed on the humidifier body 100 so that the spray angle of the spray outlet 10 can be adjusted and changed. In addition, one of the spray assembly 1 and the humidifier body 100 has at least two altering grooves 2 arranged in parallel, and the other one of the spray assembly 1 and the humidifier body 100 is provided with an altering adjustment member 3. The altering adjustment member 3 can move from one altering groove 2 to another altering groove 2 along the rotation direction of the spray assembly 1 to alter the spray angle. The rotation directions of the spray assembly 1 are as illustrated by the arrows shown in FIGS. 1 and 4.

In the humidifier having an adjustable spray angle provided in this embodiment, the spray assembly 1 is rotatably disposed on the humidifier body 100 so that the spray angle of the spray outlet 10 can be adjusted, enlarging the spray area. Consequently, a user can adjust the spray angle according to the position of an object to be sprayed so that the function of adjusting the spray angle of the humidifier can be fulfilled. In addition, when the spray angle of the spray assembly 1 is adjusted, the altering adjustment member 3 can move from one altering groove 2 to another altering groove 2 to alter the spray angle. After the spray angle is adjusted, the altering adjustment member 3 can perform limiting engagement inside one of the at least two altering grooves 2 so that the spray angle of the spray assembly 1 can be secured, ensuring the stability of the spray angle and improving the user experience.

It is to be understood that the humidifier in this embodiment may also select an evaporative humidifier, a waterjet humidifier, or a centrifugal humidifier, which falls within the protection scope of the present disclosure as long as the spray angle of water and mist inside the humidifier can be adjusted and can remain stable under the action of the airflow impact.

Optionally, one of the spray assembly 1 and the humidifier body 100 is provided with a buckling shaft 4, and the other one of the spray assembly 1 and the humidifier body 100 is provided with an engagement portion 5 having a buckling groove 51. The buckling shaft 4 is rotatably disposed inside the buckling groove 51 along the rotation direction of the spray assembly 1 so that the requirement of multi-angle rotation connection between the spray assembly 1 and the humidifier body 100 can be satisfied. During assembly, the buckling shaft 4 may be mounted on the engagement portion 5 from the opening of the buckling groove 51 by use of pressing. This is not only convenient for installation and simple in structure but also provides a stable connection.

Figure 3:
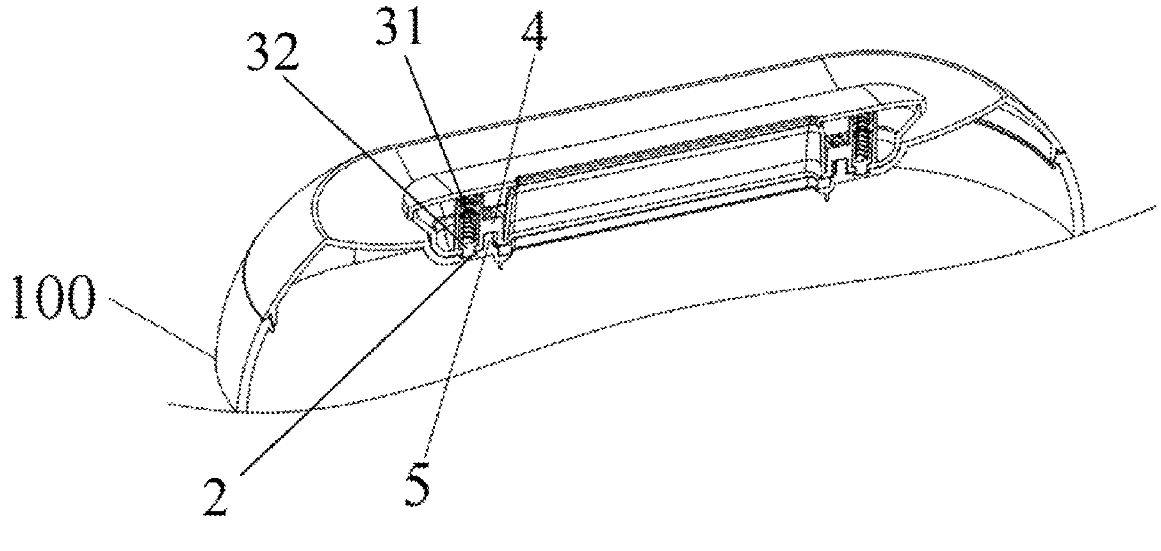
FIG. 3 is a partial cross-section view illustrating a humidifier having an adjustable spray angle according to this embodiment.
Figure 4:
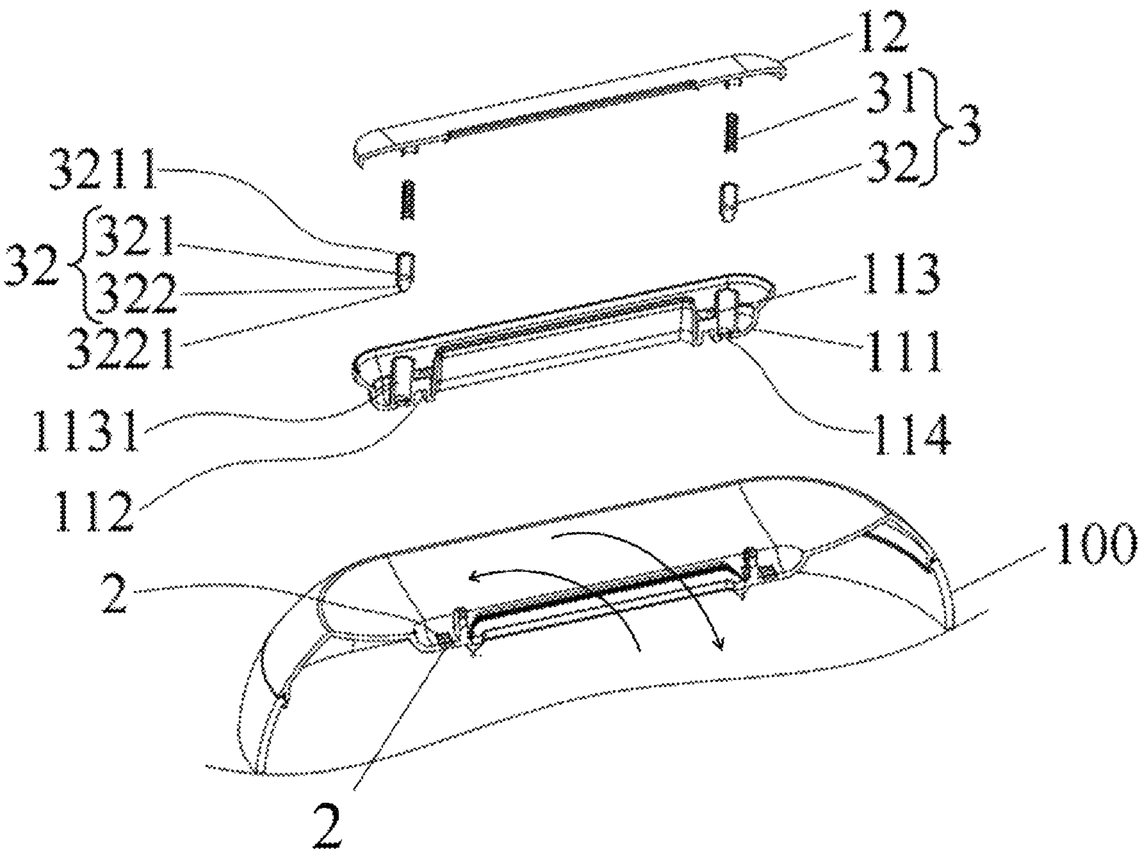
FIG. 4 is an exploded cross-section view illustrating a partial structure of a humidifier having an adjustable spray angle according to this embodiment.

Exemplarily, in conjunction with FIGS. 2 to 4, in this embodiment, the surface of the humidifier body 100 is provided with an arc-shaped groove 120. The groove bottom of the arc-shaped groove 120 is provided with the preceding mist outlet 110. The engagement portion 5 is securely connected to the groove bottom of the arc-shaped groove 120 in the manner where the opening of the buckling groove 51 faces upward (the engagement portion 5 is integrally cast and formed on the humidifier body 100 in this embodiment). The spray assembly 1 has an arc-shaped protrusion 111. An accommodating groove 112 is formed on the arc-shaped protrusion 111. Two ends of the buckling shaft 4 are securely connected to two opposite sidewalls of the accommodating groove 112 respectively. During assembly, as shown in FIG. 3, the engagement portion 5 extends into the accommodating groove 112 so that the buckling shaft 4 can be rotatably disposed inside the buckling groove 51, and so that the arc-shaped protrusion 111 can fit the arc-shaped groove 120. When the buckling shaft 4 rotates inside the arc-shaped groove 120, the arc-shaped protrusion 111 can also complete the rotation inside the arc-shaped groove 120. This can not only reduce the mounting height of the spray assembly 1 and prevent the spray assembly 1 from occupying more space in the height direction but also improve the connection compactness between the spray assembly 1 and the humidifier body 100 in the humidifier.

Certainly, in some other embodiments, the groove bottom of the arc-shaped groove 120 disposed on the humidifier body 100 may also be provided with one sinking groove having the preceding mist outlet 110, and the preceding buckling shaft 4 is securely sandwiched between two opposite sidewalls of the sinking groove. Correspondingly, the preceding engagement portion 5 is correspondingly disposed on the arc-shaped protrusion 111 of the spray assembly 1, and when the buckling shaft 4 is rotatably disposed inside the engagement portion 5, the rotation connection between the buckling shaft 4 and the buckling groove 51 can also be achieved at this time, and the fitness between the arc-shaped protrusion 111 and the arc-shaped groove 120 can also be achieved. Therefore, those skilled in the art can select specific disposed positions of the engagement portion 5 and the buckling shaft 4 according to actual requirements.

Further, in this embodiment, to prevent the buckling shaft 4 from obstructing the airflow path, two ends of the spray outlet 10 are provided with two accommodating grooves 112 respectively, one buckling shaft 4 is securely disposed inside each accommodating groove 112, two engagement portions 5 are correspondingly disposed on the arc-shaped groove 120, and the two buckling shafts 4 are rotatably connected to the two engagement portions 5 respectively. This can prevent the airflow from impinging on the buckling shaft 4 when the airflow flows toward the spray outlet 10 and effectively ensure the flow speed of the airflow. Moreover, the two buckling shafts 4 and the two engagement portions 5 are provided so that the connection between the spray assembly 1 and the humidifier body 100 can be more stable, thereby facilitating the prolongation of the service life of the humidifier.

Optionally, in this embodiment, in conjunction with FIGS. 3 and 4, the altering adjustment member 3 is disposed on the spray assembly 1, and the at least two altering grooves 2 are disposed on the humidifier body 100; the altering adjustment member 3 optionally includes a elastic member 31 and an adjustment block 32, the elastic member 31 is sandwiched between the adjustment block 32 and the spray assembly 1 in a compressed state, and one end of the adjustment block 32 facing away from the elastic member

31 can engage inside a respective altering groove 2. The adjustment block 32 is initially limited in and engaged inside one of the at least two altering grooves 2 so that the humidifier can spray water and mist in the direction in which the spray outlet 10 faces at this time. When the user needs to adjust the spray angle, the humidifier 32 can be manually operated by pressing from one side of the spray assembly 1 or pulling upward from one side of the spray assembly 1 and pressing downward from the other side of the spray assembly 1. At this time, the spray assembly 1 has a tendency to rotate in the pressing direction. At this time, one end of the adjustment block 32 slides inside the one of the at least two altering grooves 2 with the rotation of the spray assembly 1, and the elastic member 31 is further compressed. When the adjustment block 32 disengages from the previously engaged one of the at least two altering grooves 2 and moves to the next altering groove 2 arranged in parallel as the spray assembly 1 rotates, the elastic member 31 rebounds so that the one end of the adjustment block 32 can continue being limited in and engaged inside the next altering groove 2, and at this time the spray assembly 1 can also complete the adjustment and change of the spray angle.

Optionally, in this embodiment, three altering grooves 2 are provided. When the adjustment block 32 is limited in and engaged with the middle altering groove 2, the adjustment block 23 is in the vertical position at this time, and the spray outlet 10 vertically faces upward. When the adjustment block is limited in and engaged with altering grooves 2 on two sides, the angle of the spray outlet 10 is adjusted at this time with the range from −20° to 20° (based on the vertical line) so that the requirements of the number of the altering grooves 2 and the adjustable range of the angle of the spray outlet 10 in an actual working condition can be satisfied. Certainly, those skilled in the art may select the number of the altering grooves 2 and the adjustable range of the angle of the spray outlet 10 according to different actual production requirements, user requirements and use environments.

Further, in this embodiment, the bottom of the spray assembly 1 is provided with a mounting hole 114, a portion of the adjustment block 32 is limited in and passes through the mounting hole 114 and engages inside the respective altering groove 2, and the elastic member 31 extends into the spray assembly 1 through the mounting hole 114. This can enable the other portion of the adjustment block 32 and the elastic member 31 to be enclosed inside the spray assembly 1 and enable only the portion of the adjustment block 32 to extend outside the mounting hole 114 to engage with the respective altering groove 2. Compared with the configuration in which the overall structure of the altering adjustment member 3 is disposed on the surface of the spray assembly 1, this can reduce the space occupied by the altering adjustment member 3 in the height direction to some extent, improve the connection stability between the altering adjustment member 3 and the spray assembly 1 and facilitate the smooth adjustment of the spray angle of the spray assembly 1.

Optionally, in conjunction with FIGS. 2 and 4, the spray assembly 1 includes a lower housing 11 and an upper housing 12. The bottom of the lower housing 11 is provided with a limiting mounting portion 113 and the preceding mounting hole 114. The limiting mounting portion 113 has a mounting through groove 1131. The groove bottom of the mounting through groove 1131 has the mounting hole 114. Moreover, the altering adjustment member 3 is a T-shaped structure in this embodiment and includes a cooperation portion 321 and an inserting portion 322 whose diameters decrease sequentially. One end of the cooperation portion 321 facing away from the inserting portion 322 abuts against the elastic member 31. After the cooperation portion 321 is limited in and inserted into the mounting through groove 1131, the inserting portion 322 is limited in and passes through the mounting hole 114. In addition, in this embodiment, the spray outlet 10 includes a first spray outlet 101 and a second spray outlet 102 that are disposed on the lower housing 11 and the upper housing 12 respectively and communicate with each other.

The restriction of the limiting mounting portion 113 can enable the adjustment block 32 to stably perform the telescoping movement, prevent the adjustment block 32 from being tilted during the telescoping movement and further strengthen the connection stability between the altering adjustment member 3 and the spray assembly 1. Moreover, the spray assembly 1 is separable so that the efficiency of mounting, disassembling, replacing and repairing the altering adjustment member 3 can be improved.

Further, referring to FIG. 4, one end of the adjustment block 32 close to the elastic member 31 is provided with a mounting groove 3211, and a portion of the elastic member 31 is limited in and inserted into the mounting groove 3211 so that the elastic member 31 can be compressed and rebound in the axial direction, thereby avoiding the distortion of the elastic member 31. Optionally, in this embodiment, the elastic member 31 is a spring and thereby is simple in structure, easy to obtain, and exhibits good resilience.

Optionally, in this embodiment, two opposite ends of the lower housing 11 are provided with two limiting mounting portions 113 respectively, and one altering adjustment member 3 is disposed inside each limiting mounting portion 113 so as to facilitate the adjustment of the angle of the spray outlet 10 by the spray assembly 1.

Further, with continued reference to FIG. 4, in this embodiment, the inserting portion 322 has an arc-shaped lock bolt 3221, and the at least two altering grooves 2 each have an arc-shaped cross section, and at least part of the arc-shaped lock bolt 3221 can fit a respective altering groove 2, that is, after the spray angle is not adjusted or has been adjusted, a continuous fitness connection surface can be formed between the arc-shaped lock bolt 3221 and the respective altering groove 2 so that the engagement stability between the adjustment block 32 and each altering groove 2 can be ensured. Moreover, the arc-shaped lock bolt 3221 is provided so that the separation process of the adjustment block 32 from the first altering groove 2 and the engagement process of the adjustment block 32 with the second altering groove 2 can be smoother, relieving the sense of collision between the adjustment block 32 and the humidifier body 100 in a shift process and improving the user experience.

In the humidifier having an adjustable spray angle provided in the present disclosure, the spray assembly is rotatably disposed on the humidifier body so that the spray angle of the spray outlet can be adjusted, enlarging the spray area. Consequently, a user can adjust the spray angle according to the position of an object to be sprayed so that the function of adjusting the spray angle of the humidifier can be fulfilled. In addition, since, in the humidifier, the one of the spray assembly and the humidifier body has the at least two altering grooves arranged in parallel, and the other one of the spray assembly and the humidifier body is provided with the altering adjustment member. When the spray angle of the spray assembly is adjusted, the altering adjustment member can move from one altering groove to another altering groove to alter the spray angle. After the spray angle is adjusted, the altering adjustment member can be limited in and engaged with one of the at least two altering grooves so that the spray angle of the spray assembly can be secured, ensuring the stability of the spray angle and improving the user experience.

What is claimed is:

1. A humidifier having an adjustable spray angle, comprising:

a humidifier body, wherein a surface of the humidifier body has a mist outlet; and a spray assembly, wherein the spray assembly has a spray outlet which communicates with the mist outlet and is rotatably disposed on the humidifier body to enable adjustment of a spray angle of the spray outlet, wherein one of the spray assembly and the humidifier body has at least two altering grooves arranged in parallel, another one of the spray assembly and the humidifier body is provided with an altering adjustment member, and the altering adjustment member is configured to move from one altering groove to another altering groove along a rotation direction of the spray assembly to alter the spray angle.

2. The humidifier having an adjustable spray angle according to claim 1, wherein the altering adjustment member is disposed on the spray assembly, the at least two altering grooves are disposed on the humidifier body, the altering adjustment member comprises a elastic member and an adjustment block, the elastic member is sandwiched between the adjustment block and the spray assembly in a compressed state, and one end of the adjustment block facing away from the elastic member is able to engage inside a respective one of the at least two altering grooves.

3. The humidifier having an adjustable spray angle according to claim 2, wherein a mounting hole is disposed on the spray assembly; and a portion of the adjustment block is limited in and passes through the mounting hole, and engages inside the respective one of the at least two altering grooves, and the elastic member extends into the spray assembly through the mounting hole.

4. The humidifier having an adjustable spray angle according to claim 3, wherein one end of the adjustment block facing the elastic member has a mounting groove, and a portion of the elastic member is limited in and inserted into the mounting groove.

5. The humidifier having an adjustable spray angle according to claim 3, wherein the spray assembly comprises a lower housing and an upper housing, a bottom of the lower housing is provided with the mounting hole and a limiting mounting portion, a mounting through groove is formed on the limiting mounting portion, and a groove bottom of the mounting through groove has the mounting hole; and the adjustment block comprises a cooperation portion and an inserting portion whose diameters decrease sequentially, one end of the cooperation portion facing away from the inserting portion abuts against the elastic member, the upper housing is in a snap-fit connection with the lower housing and presses and abuts against the elastic member, the cooperation portion is limited in and inserted into the mounting through groove, and the inserting portion is limited in and passes through the mounting hole; and the spray outlet comprises a first spray outlet and a second spray outlet which communicate with each other and are disposed on the lower housing and the upper housing respectively.

6. The humidifier having an adjustable spray angle according to claim 5, wherein the inserting portion has an arc-shaped lock bolt, the at least two altering grooves each have an arc-shaped cross section, and at least part of the arc-shaped lock bolt fits a respective one of the at least two altering grooves.

7. The humidifier having an adjustable spray angle according to claim 2, wherein the elastic member is a spring.

8. The humidifier having an adjustable spray angle according to claim 1, wherein the one of the spray assembly and the humidifier body is provided with a buckling shaft, the another one of the spray assembly and the humidifier body is provided with an engagement portion having a buckling groove, and the buckling shaft is rotatably disposed inside the buckling groove along the rotation direction of the spray assembly.

9. The humidifier having an adjustable spray angle according to claim 8, wherein the surface of the humidifier body is provided with an arc-shaped groove, a groove bottom of the arc-shaped groove is provided with the mist outlet, the engagement portion is securely connected to the groove bottom of the arc-shaped groove; the spray assembly has an arc-shaped protrusion, an accommodating is formed on the arc-shaped protrusion, two ends of the buckling shaft are securely connected to two opposite sidewalls of the accommodating groove respectively, and the engagement portion extends into the accommodating groove to enable the buckling shaft to be rotatably disposed inside the buckling groove and to enable the arc-shaped protrusion to fit the arc-shaped groove.

10. The humidifier having an adjustable spray angle according to claim 1, wherein the at least two altering grooves comprise three altering grooves.

11. The humidifier having an adjustable spray angle according to claim 3, wherein the elastic member is a spring.

12. The humidifier having an adjustable spray angle according to claim 4, wherein the elastic member is a spring.

13. The humidifier having an adjustable spray angle according to claim 5, wherein the elastic member is a spring.

14. The humidifier having an adjustable spray angle according to claim 6, wherein the elastic member is a spring.

* * * * *